(12) United States Patent
Subbarayan et al.

(10) Patent No.: US 8,954,584 B1
(45) Date of Patent: Feb. 10, 2015

(54) POLICY ENGINE FOR AUTOMATING MANAGEMENT OF SCALABLE DISTRIBUTED PERSISTENT APPLICATIONS IN A GRID

(75) Inventors: Udayakumar Subbarayan, Santa Clara, CA (US); Friedrich Ferstl, Maxhuette-Haidhof (DE); Charu V. Chaubal, Burlingame, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1298 days.

(21) Appl. No.: 10/921,600

(22) Filed: Aug. 18, 2004

(51) Int. Cl.
| | |
|---|---|
| G06F 15/173 | (2006.01) |
| H04L 12/919 | (2013.01) |
| H04L 12/923 | (2013.01) |
| H04L 12/911 | (2013.01) |
| H04L 5/00 | (2006.01) |
| H04L 12/70 | (2013.01) |
| G06Q 10/06 | (2012.01) |

(52) U.S. Cl.
CPC ........... *H04L 47/765* (2013.01); *H04L 47/762* (2013.01); *H04L 47/72* (2013.01); *H04L 47/822* (2013.01); *H04L 5/0035* (2013.01); *H04L 2012/5631* (2013.01); *H04L 47/78* (2013.01); *G06Q 10/06315* (2013.01)
USPC .......... 709/226; 709/201; 709/221; 709/224; 709/235; 718/104; 718/105; 718/106

(58) Field of Classification Search
USPC .......... 709/201, 221, 224, 226, 235; 718/104, 718/105, 106
See application file for complete search history.

(56) References Cited

U.S. PATENT DOCUMENTS

| | | | |
|---|---|---|---|
| 5,881,238 A * | 3/1999 | Aman et al. .................. 709/226 |
| 6,055,508 A * | 4/2000 | Naor et al. .................... 705/7.38 |
| 6,282,560 B1 | 8/2001 | Eilert et al. | |
| 6,327,622 B1 * | 12/2001 | Jindal et al. ................... 709/228 |
| 6,654,780 B1 * | 11/2003 | Eilert et al. ................... 718/104 |
| 6,748,555 B1 * | 6/2004 | Teegan et al. .............. 714/38.12 |
| 6,782,527 B1 * | 8/2004 | Kouznetsov et al. ......... 717/103 |
| 6,823,382 B2 * | 11/2004 | Stone ............................ 709/224 |
| 6,851,030 B2 * | 2/2005 | Tremaine ..................... 711/160 |
| 6,874,020 B1 * | 3/2005 | Da Palma et al. ............. 709/223 |
| 6,963,917 B1 * | 11/2005 | Callis et al. ................... 709/227 |
| 7,035,930 B2 * | 4/2006 | Graupner et al. ............. 709/226 |
| 7,051,098 B2 * | 5/2006 | Masters et al. ................ 709/224 |
| 7,073,135 B2 * | 7/2006 | Harris ........................... 715/772 |

(Continued)

FOREIGN PATENT DOCUMENTS

WO WO 2007101403 A1 9/2007

OTHER PUBLICATIONS

Sun Microsystems, Inc., "Java™ Management Extensions White Paper" Dynamic Management for the Service Age, Revision 01, Jun. 1999, 16 pgs.

(Continued)

*Primary Examiner* — Michael Y Won
(74) *Attorney, Agent, or Firm* — Osha Liang LLP

(57) ABSTRACT

There are provided mechanisms and methods for automating management of Scalable Distributed Persistent Applications (SDPA) in a grid computing environment. These mechanisms and methods make it possible for physical and operating system resources in the grid to be dynamically allocated and/or de-allocated based upon the results of monitoring performance and monitoring usage of physical and operating system resources.

31 Claims, 11 Drawing Sheets

(56) References Cited

U.S. PATENT DOCUMENTS

| | | | |
|---|---|---|---|
| 7,139,821 B1* | 11/2006 | Shah et al. | 709/224 |
| 7,174,534 B2* | 2/2007 | Chong et al. | 717/105 |
| 7,249,179 B1* | 7/2007 | Romero et al. | 709/226 |
| 7,269,652 B2* | 9/2007 | Chen et al. | 709/226 |
| 7,275,142 B1* | 9/2007 | Schultz et al. | 711/162 |
| 7,278,142 B2 | 10/2007 | Bandhole et al. | |
| 7,318,056 B2* | 1/2008 | Taniguchi et al. | 709/219 |
| 7,328,259 B2* | 2/2008 | Srinivasan et al. | 709/223 |
| 7,496,667 B2* | 2/2009 | Adam et al. | 709/226 |
| 8,112,756 B2* | 2/2012 | Cherkasova et al. | 718/104 |
| 8,234,375 B2* | 7/2012 | Ghadialy et al. | 709/225 |
| 8,381,004 B2* | 2/2013 | Elnozahy et al. | 713/321 |
| 8,621,178 B1* | 12/2013 | Lazar | 711/173 |
| 2002/0049803 A1* | 4/2002 | Bandhole et al. | 709/104 |
| 2002/0065864 A1* | 5/2002 | Hartsell et al. | 709/100 |
| 2002/0166117 A1* | 11/2002 | Abrams et al. | 717/177 |
| 2002/0174227 A1* | 11/2002 | Hartsell et al. | 709/226 |
| 2003/0005028 A1* | 1/2003 | Dritschler et al. | 709/104 |
| 2003/0051029 A1* | 3/2003 | Reedy et al. | 709/224 |
| 2003/0084156 A1* | 5/2003 | Graupner et al. | 709/226 |
| 2003/0204588 A1* | 10/2003 | Peebles et al. | 709/224 |
| 2003/0204789 A1* | 10/2003 | Peebles et al. | 714/47 |
| 2004/0139202 A1* | 7/2004 | Talwar et al. | 709/229 |
| 2004/0194066 A1* | 9/2004 | Frey et al. | 717/127 |
| 2004/0221202 A1* | 11/2004 | Nye et al. | 714/38 |
| 2005/0033751 A1* | 2/2005 | Maron | 707/100 |
| 2005/0038789 A1* | 2/2005 | Chidambaran et al. | 707/10 |
| 2005/0155033 A1* | 7/2005 | Luoffo et al. | 718/104 |
| 2005/0177635 A1* | 8/2005 | Schmidt et al. | 709/226 |
| 2013/0080910 A1* | 3/2013 | Bingell et al. | 715/744 |
| 2013/0253935 A1* | 9/2013 | Gundam et al. | 704/260 |

OTHER PUBLICATIONS

Sandip Agarwala, et al., "System-Level Resource Monitoring in High-Performance Computing Environments", Journal of Grid Computing, Kluwer Academic Publishers Netherlands 2003, pp. 273-289.
Sun Microsystems, Inc., "Grid Engine", SunSource.Net, http://gridengine.sunsource.net/project/gridengine/module_doc.html, retrieved Nov. 24, 2004, pp. 1-7.

* cited by examiner

POLICY ENGINE FOR AUTOMATING MANAGEMENT OF SCALABLE DISTRIBUTED PERSISTENT APPLICATIONS IN A GRID

CROSS REFERENCE TO RELATED APPLICATIONS

The present application contains subject matter that may be related to the subject matter in the following U.S. applications filed on Aug. 18, 2004, and assigned to the assignee of the present application: U.S. application Ser. No. 10/921,595; U.S. application Ser. No. 10/921,544; and U.S. application Ser. No. 10/921,599.

BACKGROUND

In grid based computer implementations, it is desirable to be able to distribute work among a plurality of interconnected nodes forming a grid computing environment. Conventional approaches to the problem typically employ a distributed resource manager that allocates work to nodes having available computing resources. However, the conventional approaches are batch oriented—that is, conventional approaches rely upon the work being able to be processed by the computers comprising the grid as a background task. In other words, in such conventional approaches, there are typically no users waiting with active sessions relying upon the results to be provided within a relatively short period of time.

Conventional approaches typically involve the use of a statically provisioned computing grid. Accordingly, the distributed resource manager may be apprised of only the workload and capabilities of the computers in the grid. Since computing grids are conventionally not used to support scalable distributed persistent applications (SDPA), i.e., a program without a definite termination point, there is no way to determine based upon the performance of a persistent application how that application is performing and whether additional resources need to be dedicated to the application. The result of such a deficiency is that when a persistent application, such as a web server, is met with a surge in demand, such as experienced by many news sites during the 9/11 attacks, such systems are not capable of adjusting to handle the increased load. In one possible approach, a larger amount of resources could be statically allocated to the application in order to provide a large safety factor. However, the excess resources would typically be idle most of the time, leading to waste and inefficiency.

SUMMARY

In accordance with one embodiment of the present invention, there are provided mechanisms and methods for automating management of Scalable Distributed Persistent Applications (SDPA) in a grid computing environment. Conceptually, a grid computing environment, or grid, is a collection of computing resources that performs tasks or renders services. Scalable Distributed Persistent Applications include without limitation application servers, web servers, portal servers, directory servers, web hosting, mail hosting and communication infrastructure provisioning applications and related applications, such as DSL provisioning, frame relay circuit provisioning and the like, simulations, and large volume data processing, data resource infrastructure managers and related applications and other applications having an indefinite lifespan implemented on a computer are contemplated. These mechanisms and methods make it possible for physical and operating system resources in the grid to be dynamically allocated and/or de-allocated based upon the results of monitoring performance and monitoring usage of physical and operating system resources. Physical resources include without limitation processors, storage, peripheral devices and other devices operable with a computer or other processor based device to enhance the functionality of the computer or other processor based device are contemplated.

In one embodiment, a plurality of nodes comprising the grid is connected to a manager that manages use of the nodes. The manager may be a policy engine embedded within a grid engine that controls workflow to the grid, and may be deployed on one or more nodes of the grid. A plurality of persistent applications executing on the plurality of nodes provides a service to one or more users. Performance parameters about the service and usage information for usage of physical and operating system resources dedicated to the persistent applications are received at the policy engine. A set of one or more policies is applied to the performance parameters by the policy engine to determine if the performance parameters meet one or more conditions specified by the set of policies. A determination is made whether more or fewer instances of the persistent application are needed in order to meet the conditions specified by the set of policies.

The mechanisms and methods for automating management of Scalable Distributed Persistent Applications (SDPA) enables resources to be dynamically allocated and/or de-allocated to the scalable distributed persistent applications based upon performance and other criteria. This ability to automatically scale grid resources based on the performance of scalable distributed persistent applications makes it possible for physical and operating system resources in the grid to be dynamically allocated and/or de-allocated.

DETAILED DESCRIPTION OF EMBODIMENT(S)

Conceptual Overview

In accordance with one embodiment of the present invention, there are provided mechanisms and methods for automating management of Scalable Distributed Persistent Applications (SDPA) in a grid computing environment. Scalable Distributed Persistent Applications include without limitation application servers, web servers, portal servers, directory servers, web hosting, mail hosting and communication infrastructure provisioning applications and related applications, such as DSL provisioning, frame relay circuit provisioning and the like, simulations, and large volume data processing, data resource infrastructure managers and related applications and other applications having an indefinite lifespan implemented on a computer are contemplated. These mechanisms and methods make it possible for physical and operating system resources in the grid to be dynamically allocated and/or de-allocated based upon the results of monitoring performance and monitoring usage of physical and operating system resources. In various embodiments, the physical and operating system resources include without limitation one or more of processors, storage, peripheral devices and other devices operable in conjunction with a computer or other processor based device to enhance the functionality of the computer or other processor based device are contemplated.

Figure 3A:
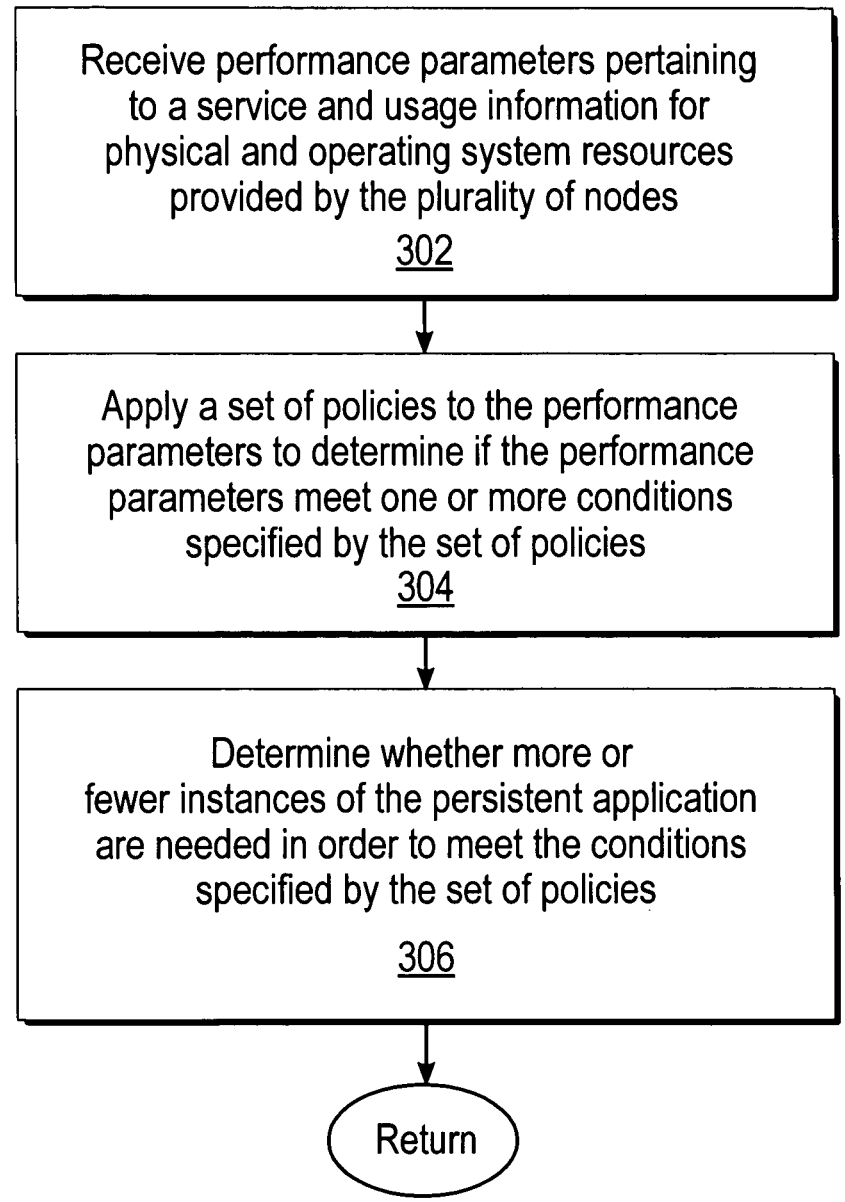
FIGS. 3A-3F are operational flow diagrams illustrating the operation of one embodiment of the present invention.

In one embodiment, a plurality of nodes comprising the grid is connected to a manager that manages usage of the nodes. The manager may be a policy engine embedded within a grid engine that controls workflow to the grid, and may be deployed on one or more nodes of the grid. A plurality of persistent applications execute on the plurality of nodes provides a service to one or more users. An operational flow diagram, which provides a high level overview of one embodiment of the present invention, is shown in FIG. 3A.

In one embodiment, performance parameters about the service and usage information for physical and operating system resources provided by the plurality of nodes are received (block 302). A set of one or more policies is applied to the performance parameters to determine if the performance parameters meet one or more conditions specified by the set of policies (block 304). A determination is made whether more or fewer instances of the persistent application are needed in order to meet one or more conditions specified by the set of policies (block 306). In various embodiments, the performance parameter includes without limitation one or more of hits to a web page per unit time, a response time, a number of transactions per unit time and other metrics for determining system performance are contemplated. In various embodiments, the usage information includes without limitation one or more of CPU utilization, bandwidth utilization, a number of applications per operating system image and other metrics for determining usage or loading of computer resources are contemplated.

In one embodiment, in response to a determination that at least one additional instance of the persistent application is needed, a provisioning decision is made based at least partially upon the usage information for the physical and operating system resources.

In one embodiment, the provisioning decision includes determining whether the additional instance should be provisioned on one of the plurality of nodes on which an instance of the persistent application is already executing. In response to a determination that an additional instance should be provisioned on one of the plurality of nodes on which an instance of the persistent application is already executing, nodes upon which additional instances of the persistent application may be deployed are selected from the plurality of nodes. Additional instances of the persistent application are deployed on the selected nodes.

In one embodiment, the provisioning decision includes determining whether one or more unused instances of the persistent application are deployed on one or more of the plurality of nodes. In response to a determination that at least one unused instance of the persistent application exists, one or more instances of the persistent application that may be off-loaded are selected from excess persistent application instances. The selected instances of the persistent application are de-allocated.

In other aspects, the invention encompasses in some embodiments, computer apparatus, computing systems and machine-readable media configured to carry out the foregoing methods.

Embodiments can enable dynamically allocating and/or de-allocating physical and operating system resources in the grid based upon the results of monitoring performance and monitoring usage of physical and operating system resources.

System Overview

Figure 1:
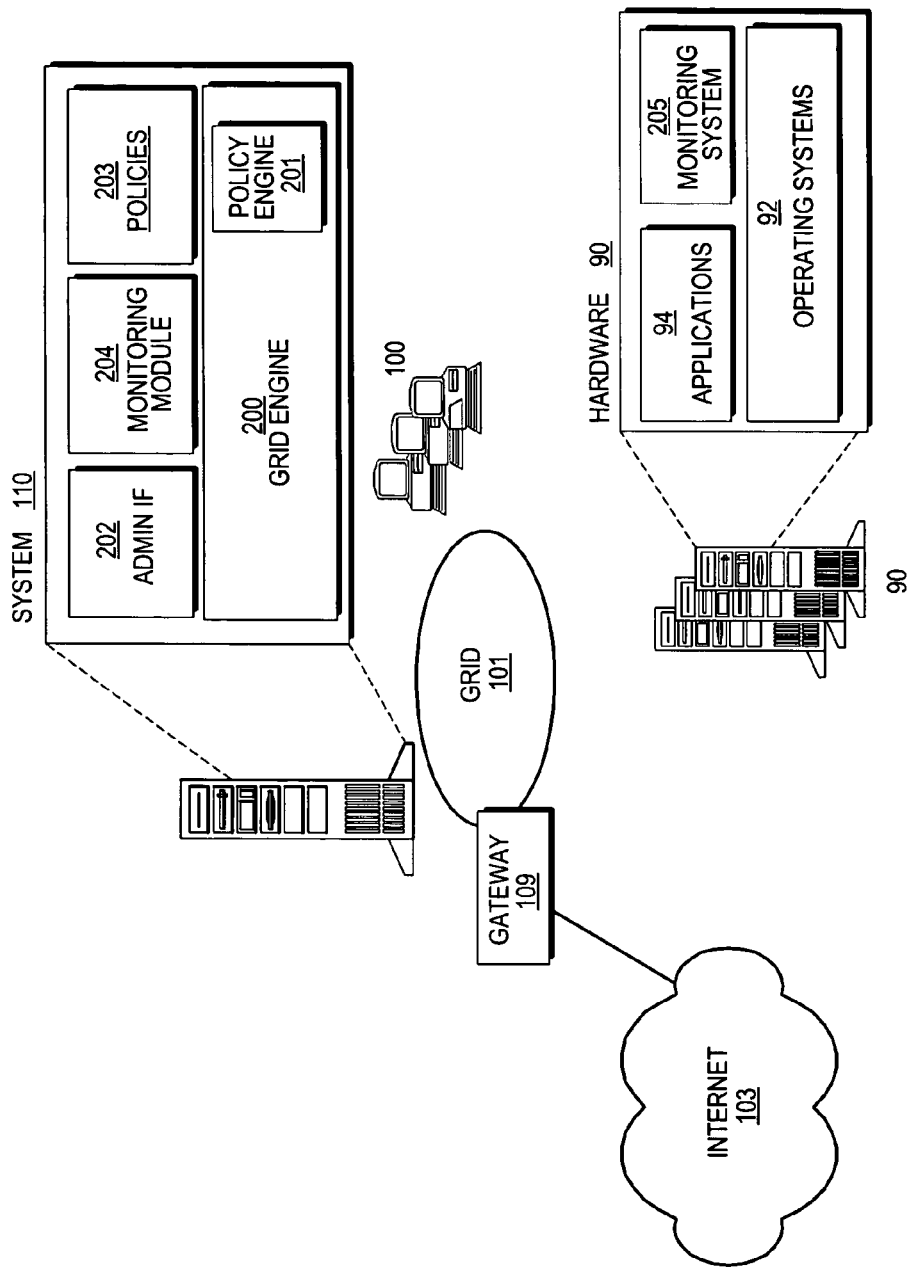
FIG. 1 is a functional block diagram of an example grid computing environment in which one embodiment of the present invention may be implemented.

FIG. 1 is a functional block diagram of an example grid computing environment in which monitoring performance of one or more persistent applications may be implemented. While the invention is illustrated generally with reference to an example of general purpose computers connected to a manager, the present invention does not require such an environment, and in some embodiments, techniques according to the invention may be implemented in multi-processing environments having various different configurations. Conceptually, a grid computing environment, or grid, is a collection of computing resources that performs tasks. The grid includes a resource manager that provides a single point of access to a plurality of computing resources. While the computing resources need not be co-located, and frequently are distributed across a large geographical area, users can treat the grid has a single computational resource.

As shown in FIG. 1, an example grid computing environment in which one embodiment of the present invention may be implemented includes a computing grid 101. Computing grid 101 comprises a variety of interconnected computing resources, including computing resources 90 and 100 managed by system 110, which acts as a resource manager for the grid. Optionally, a gateway 109, which can be a modem, router, local area network (LAN) connection, wide area network (WAN) connection, or other device or devices that provides connectivity can provide connectivity with Internet 103 or other publicly accessible networks. In various embodiments, system 110 and computing resources 90 and 100, may be connected by any one or more other variety of connections including networks, both public or private, communications links, shared memory interconnections, optical interconnections or the like.

System 110 includes a number of components that enable system 110 to act as a resource manager for the grid. For example, system 110 includes grid engine 200, an administrative interface 202 and a monitoring module 204. The monitoring module 204 receives configuration information 96 (of FIG. 2) for each of the applications 94 that comprise a particular service. Monitoring module 204 also receives performance parameters for the applications 94 and usage information for the resources, such as hardware 90 and operating systems 92 on the various nodes. Monitoring module 204 processes the performance parameters information to obtain one or more overall performance parameter(s) for a particular service. Administrative interface 202 provides a mechanism for receiving requests from users external to the grid 101 and providing responses to the users' requests.

Computing resources 90 and 100 include any number and variety of computing resources. As shown in FIG. 1, computing resources 90 includes hardware upon which one or more operating systems 92 and one or more applications 94 may be deployed. Multiple applications 94 may execute on separate nodes of grid 101. The applications 94 may function together to provide an overall service. Services can include without limitation, such as financial transactions, i.e., banking, equity and commodity trading; merchandise sales, i.e., book sales clothing sales; consumer and business services, i.e., travel agency, equipment rental; an internet service provider (ISP) and other services implemented upon a computer are contemplated. For example an ISP may include various services components, such as without limitation routers, switches, servers and other hardware and software that provide infrastructure to the ISP services. The example services include without limitation DSL provisioning, frame relay circuits, web hosting, mail hosting and communication infrastructure provisioning and related services, as well as computing and data resource infrastructure and related services.

System 110 has the capability to allocate and de-allocate hardware 90, provision operating systems 92 on the hardware 90, and deploy one or more instances of applications 94 under the operating systems 92 in order to satisfy a request to provide a service. Grid engine 200 includes a policy engine 201 that makes a determination of whether more or fewer physical and operating system resources of grid 101 need to be allocated to the persistent applications 94 based upon monitoring information received from the monitoring module 204.

Policy engine 201 as operatively coupled to monitoring module 204 that provides monitoring information about applications 94, operating systems 92 and hardware 90 received from a monitoring system 205 deployed with the computing resources 90 and 100. Monitoring information includes performance parameter information about the service provided by the persistent applications 94 and usage information about physical and operating system resources, such as operating systems 92, hardware 90. In one embodiment, policy engine 201 uses performance parameters such as, without limitation, one or more of hits to a web page per unit time, response time, number of transactions per unit time and other metrics for determining system performance in making determinations whether more or fewer resources are to be allocated to the persistent applications. In one embodiment, the policy engine 201 employs usage information such as, without limitation, one or more of CPU utilization, bandwidth utilization, number of applications per operating system image and other metrics for determining usage or loading of computing resources, to determine a quantity of additional resources to allocate to an application, or to determine a quantity of excess resources to de-allocate from the application.

A monitoring system 205 provides performance parameter information about one or more persistent applications that render a service and usage information about physical and operating system resources upon which the persistent applications are deployed in the grid 101. Monitoring system 205 may be implemented in a variety of ways in different embodiments, however, in one embodiment, monitoring performance parameters of the persistent applications on the plurality of nodes includes receiving information from a software object configured to expose one or more parameters of the persistent application using a configurable re-usable configuration frameworks. While application specific alternatives exist, in one example application, the software object may be realized as a management bean (MBean) coupled to a configurable re-usable configuration framework implementing the Java Management Extension (JMX) specification of SUN Microsystems Incorporated to perform monitoring. In other implementations, the software objects may be classes implemented in one or more of C++, C#, REXX, or other object oriented programming systems, and the framework may be any of the re-usable configurable frameworks corresponding to the object oriented programming system being used.

MBeans are object classes associated with application 94, for example, to implement a JMX interface in order to expose certain aspects of the application 94 for monitoring. The MBeans are registered with the MBean server. The MBean server invokes the interfaces implemented by the MBeans in order to obtain performance monitoring information. A distributed service layer is used by remote management tools, such as monitoring module 204, in order to interface with the MBean server.

Figure 2:
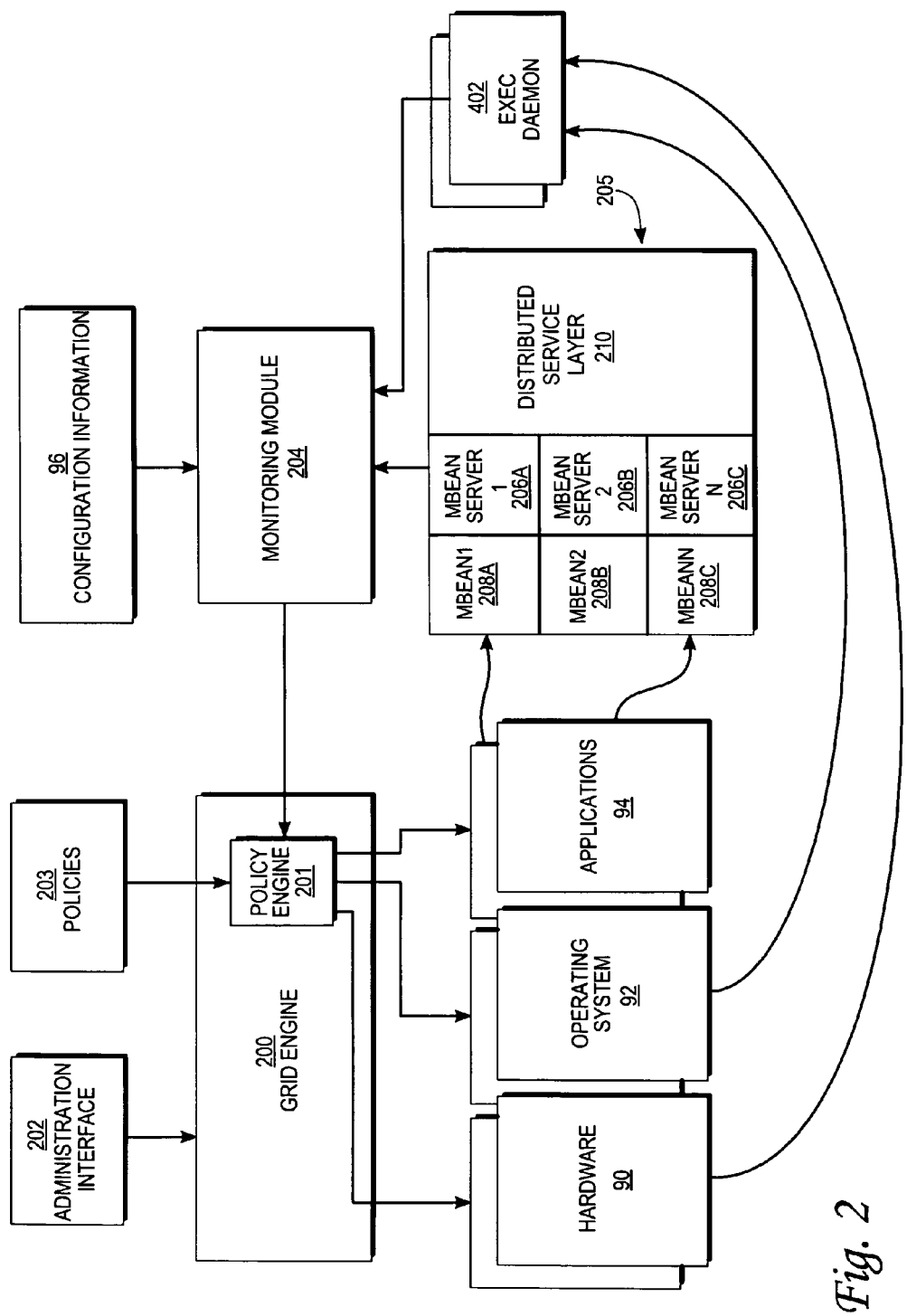
FIG. 2 is functional block diagram of automated scalable distributed persistent application management in the computing environment of FIG. 1 in one embodiment of the present invention.

FIG. 2 is a functional block diagram of performance and usage monitoring in the computing environment of FIG. 1 in accordance with one embodiment of the present invention. As depicted by FIG. 2, a plurality of associated computing resources, including hardware 90, operating systems 92 and applications 94 of grid 101 are controlled by grid engine 200. The grid engine 200 is responsible for provisioning hardware and software that allow the persistent applications 94 to run in the grid 101. For example, a request from a user to a certain persistent application may include a message to a persistent application selected from one or more of applications 94. Accordingly, grid engine 200 has the capabilities to allocate and de-allocate hardware 90, provision operating systems 92 on the hardware 90, and deploy applications 94 under the operating systems 92 in order to respond to the request. Grid engine 200 can include a distributed resource manager (not shown), a policy engine 201, and the like, in specific embodiments.

Grid engine 200 includes a policy engine 201 that is operatively coupled to monitoring module 204, which provides monitoring information about applications 94, operating systems 92 and hardware 90. In one embodiment, usage information for physical and operating system resources may be monitored using a different mechanism from the mechanism used to monitor performance parameters. For example, as illustrated by FIG. 2, in one embodiment, monitoring module 204 employs a re-usable configuration framework conforming to the Java management extensions (JMX) specification to perform monitoring of performance parameters exposed by applications 94 and an exec daemon 402 is used to perform monitoring of usage information for physical and operating system resources such as hardware 90 and operating systems 92. In an alternative embodiment, usage information for physical and operating system resources is monitored using an identical mechanism to the mechanism used for monitoring performance parameters. Performance parameters include without limitation hits to a web page per unit time, response time, number of transactions per unit time and other metrics for determining performance of computer applications are contemplated. Usage information includes without limitation one or more of CPU utilization, bandwidth utilization, a number of applications per operating system image and other metrics for determining usage or loading of computer resources are contemplated.

In one embodiment, monitoring performance parameters is achieved with a management application having a configuration framework with attributes of re-usability, configurability and standardization, an example of which is Java Management eXtensions (JMX), including one or more software objects realized as management beans, Mbeans 208A, 208B and 208C, which comprise a JMX instrumentation layer. The MBeans 208A, 208B and 208C are Java class objects associated with one or more of the applications 94 in order to monitor these computational resources and expose the monitored quantities using a JMX application programming interface (JMX API). Each one of the MBeans 208A, 208B and 208C is operatively connected with one or more MBean servers 206A, 206B and 206C, which comprise a JMX agent layer. The one or more MBean servers 206A, 206B and 206C provide remote management of each of the MBeans 208A, 208B and 208C on behalf of the monitoring module 204. The MBean servers 206A, 206B and 206C interface to the MBeans 208A, 208B and 208C that have registered with the MBeans servers 206A, 206B and 206C using the JMX API. While the above example is discussed with reference to an embodiment in which the software object is realized as a management bean (MBean) coupled to a configurable re-usable configuration framework implementing the Java Management Extension (JMX) specification of SUN Microsystems Incorporated to perform monitoring, application alternatives exist. In other implementations, the software objects may be classes implemented in one or more of C++, C#, REXX, or other object oriented programming systems, and the framework may be any of the re-usable configurable frameworks corresponding to the object oriented programming system being used.

A distributed service layer 210 provides interfaces and components that the monitoring module 204 uses to interface with the one or more MBean servers 206A, 206B and 206C in order to obtain remote monitoring information about one or more of the applications 94. In some embodiments, not all of applications 94 will be monitored.

In one embodiment, an exec daemon 402 is used to perform monitoring of usage information for physical and operating system resources such as hardware 90 and operating systems 92. The exec daemon 402 passes the usage information to the monitoring module 204. In some embodiments, other computing resources not shown in FIG. 2 will be monitored.

FIGS. 3A-3F are operational flow diagrams illustrating the operation of one embodiment of the present invention. As discussed earlier with reference to FIG. 3A, embodiments provide automating of management of physical and operating system resources in a computing grid in which performance parameters about a service and usage information for physical and operating system resources allocated to the persistent applications are received (block 302). A set of one or more policies is applied to the performance parameters to determine if the performance parameters meet one or more conditions specified by the set of policies (block 304). A determination is made whether more or fewer instances of the persistent application are needed in order to meet the conditions specified by the set of policies (block 306). Automating management will now be described in further detail with reference to example embodiments illustrated by FIGS. 3B-3F.

Figure 3B:
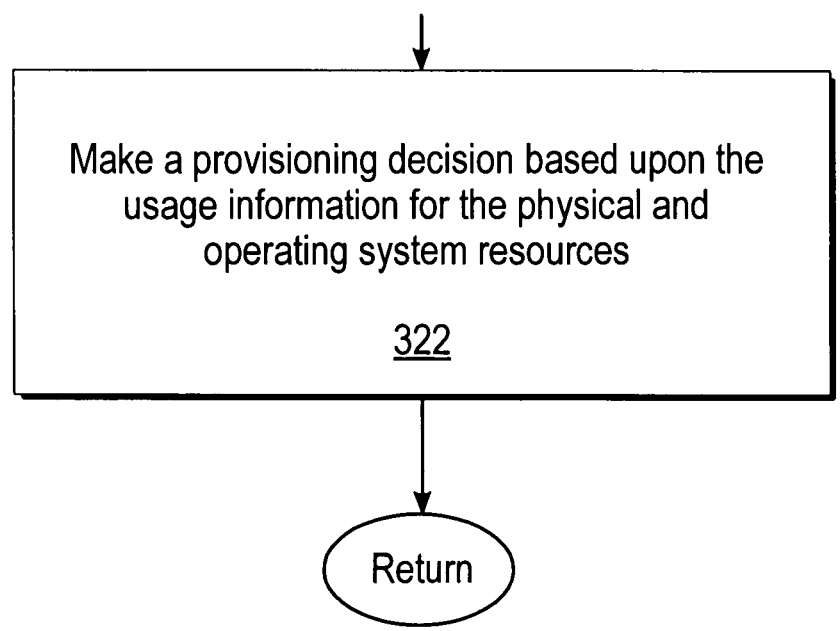

Now with reference to FIG. 3B, the policy engine makes a provisioning decision based at least partially upon the usage information for the physical and operating system resources (block 322).

Figure 3C:
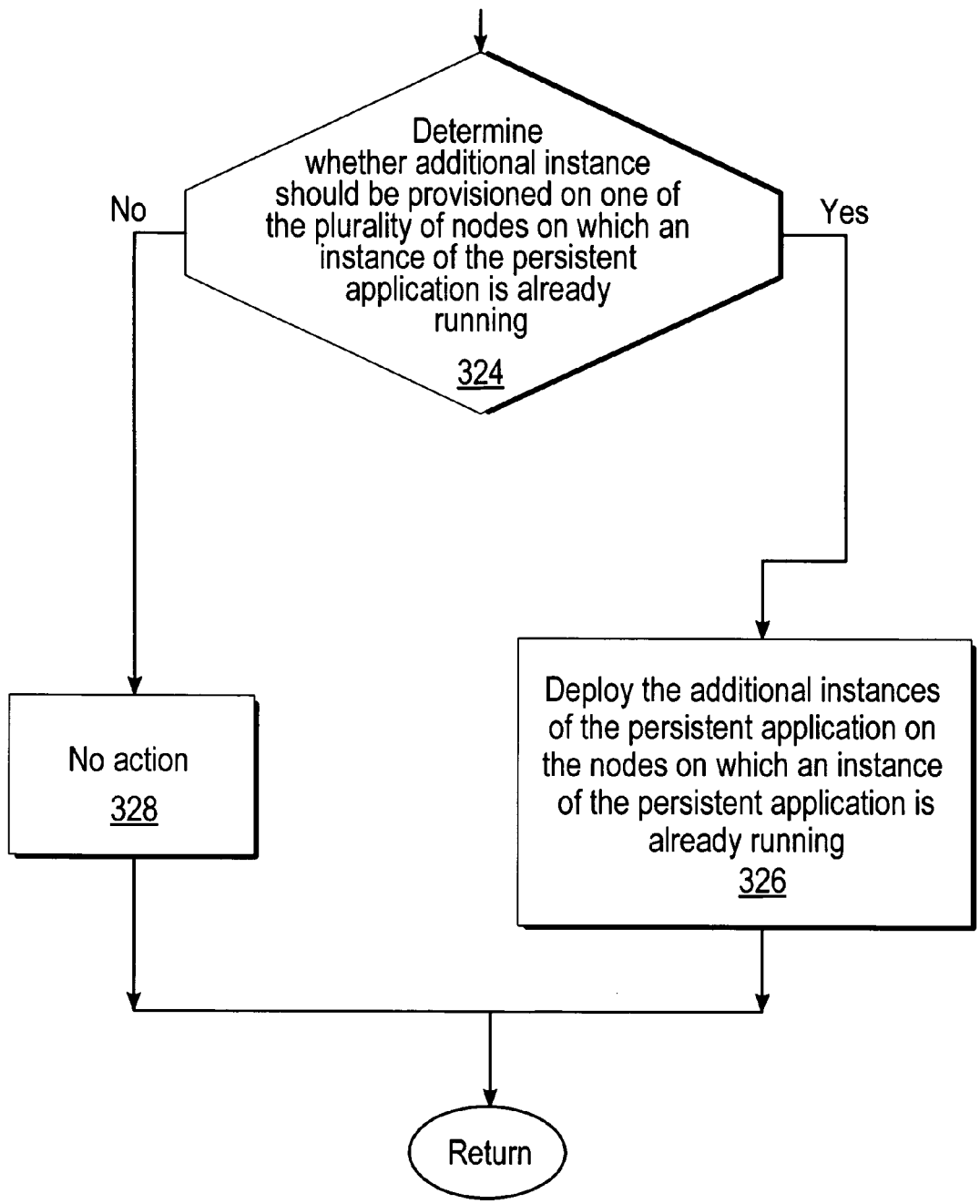

Now with reference to FIG. 3C, the policy engine determines whether an additional instance of the persistent application should be provisioned on one of the plurality of nodes on which an instance of the persistent application is already executing (block 324). If the policy engine determines that the additional instance of the persistent application should be provisioned on one of the plurality of nodes on which an instance of the persistent application is already executing, then the new instance is provisioned on a node in which the persistent application is already executing (block 326). Otherwise, the policy engine takes no further action (block 328). An example of processing for deploying additional instances of the persistent application is described below with reference to FIG. 3E.

Figure 3D:
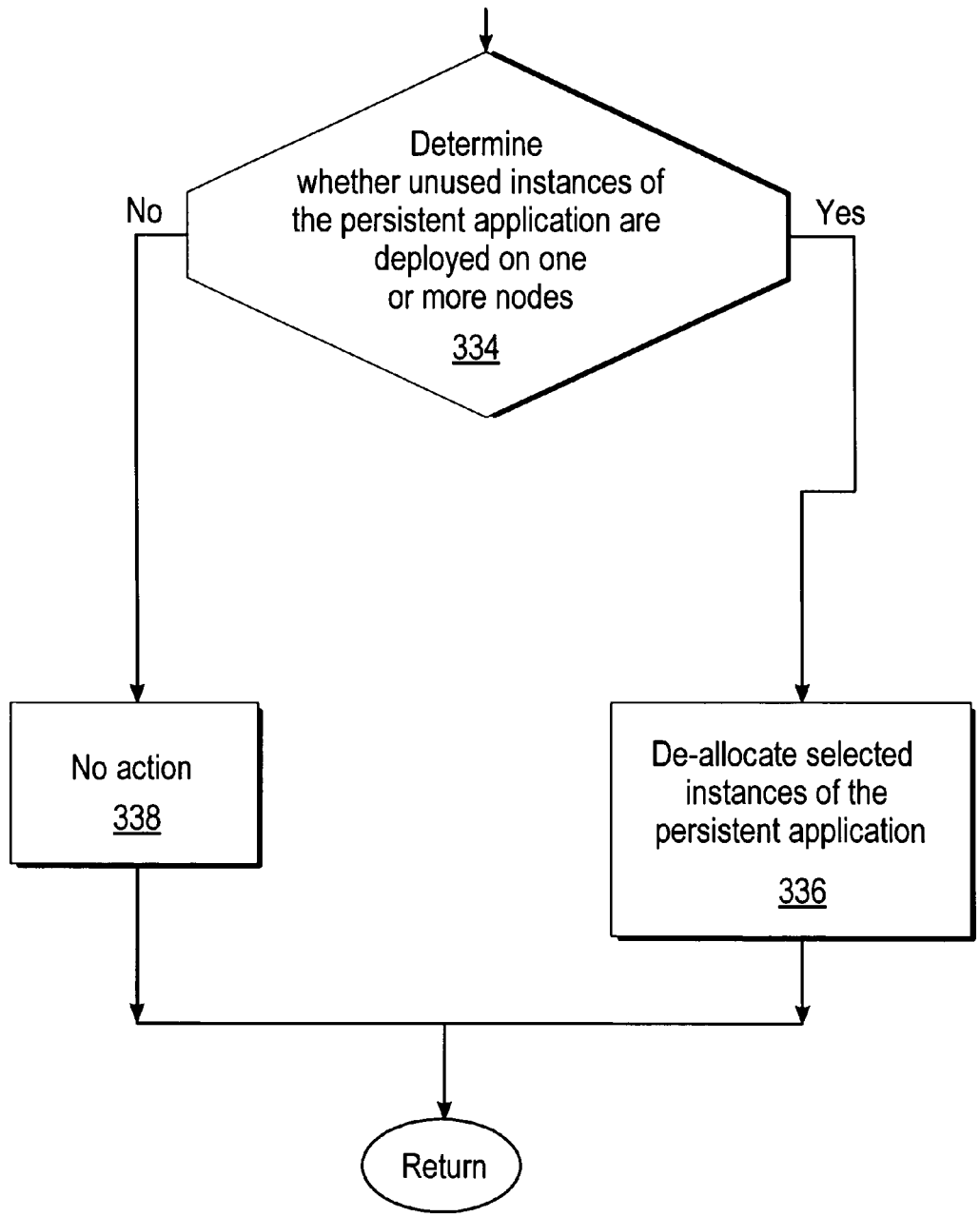

Now with reference to FIG. 3D, the policy engine determines whether unused instances of the persistent application are deployed on one or more of the plurality of nodes (block 334). If unused persistent application instances are present, the policy engine may de-allocate selected instances of the persistent application (block 336). Otherwise, the policy engine takes no further action (block 338). An example of processing for de-allocating instances of the persistent application is described below with reference to FIG. 3F.

Figure 3E:
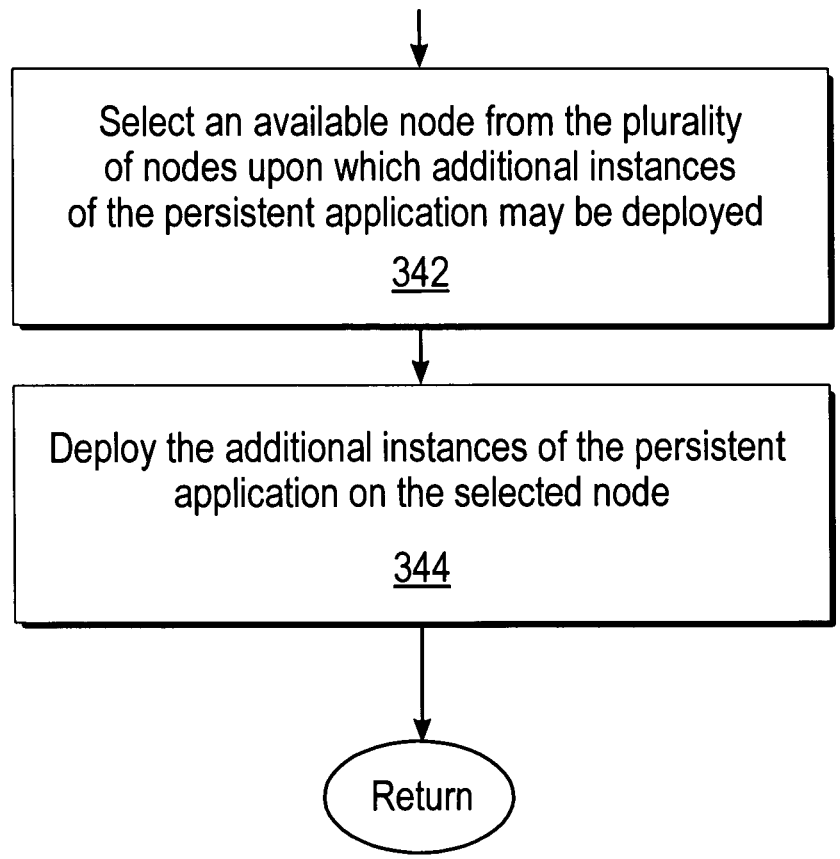

Now with reference to FIG. 3E, the policy engine selects from the plurality of nodes, nodes upon which additional instances of the persistent application may be deployed (block 342). The policy engine deploys the additional instances of the persistent application on the selected nodes (block 344).

Figure 3F:
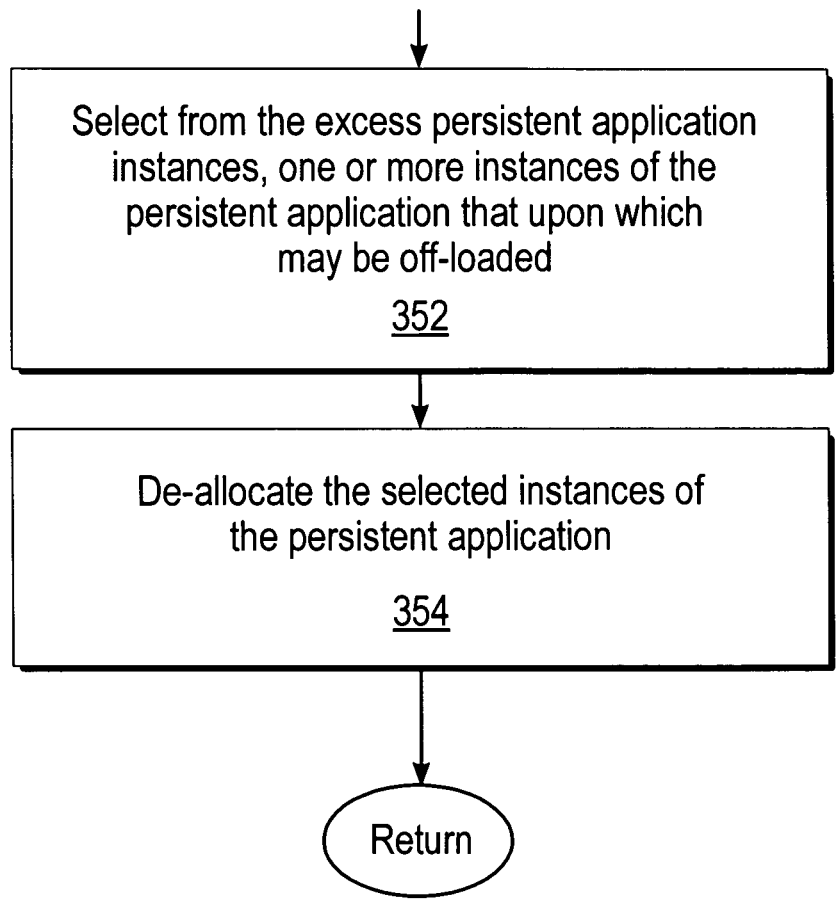

Now with reference to FIG. 3F, the policy engine selects from the excess persistent application instances, one or more instances of the persistent application that may be off-loaded (block 352). The policy engine de-allocates the selected instances of the persistent application from the selected physical and operating system resources (block 354).

Example Operation

Figure 4A:
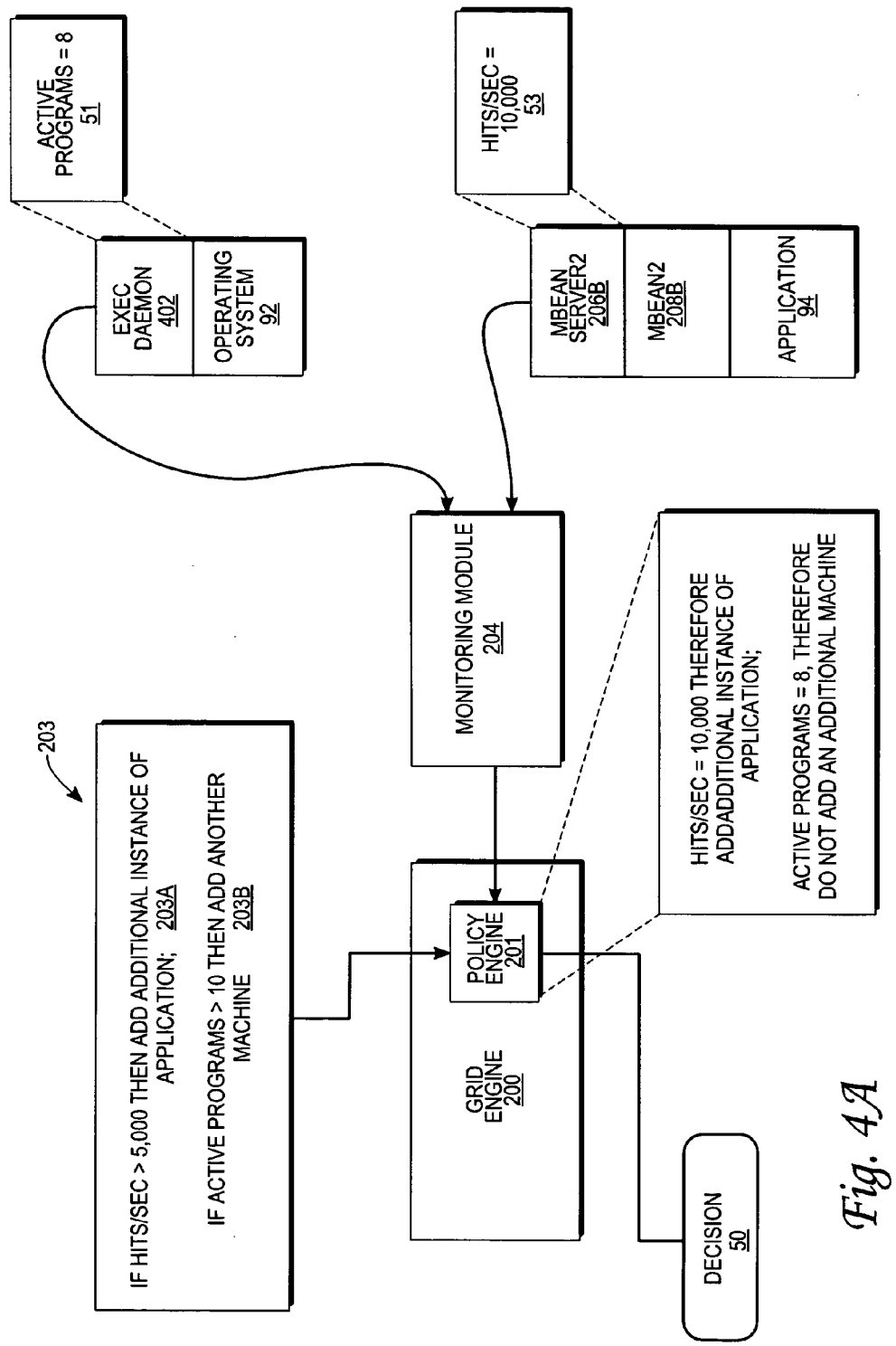
FIGS. 4A-4B are functional block diagrams illustrating an example of automated management in one embodiment of the present invention.
Figure 4B:
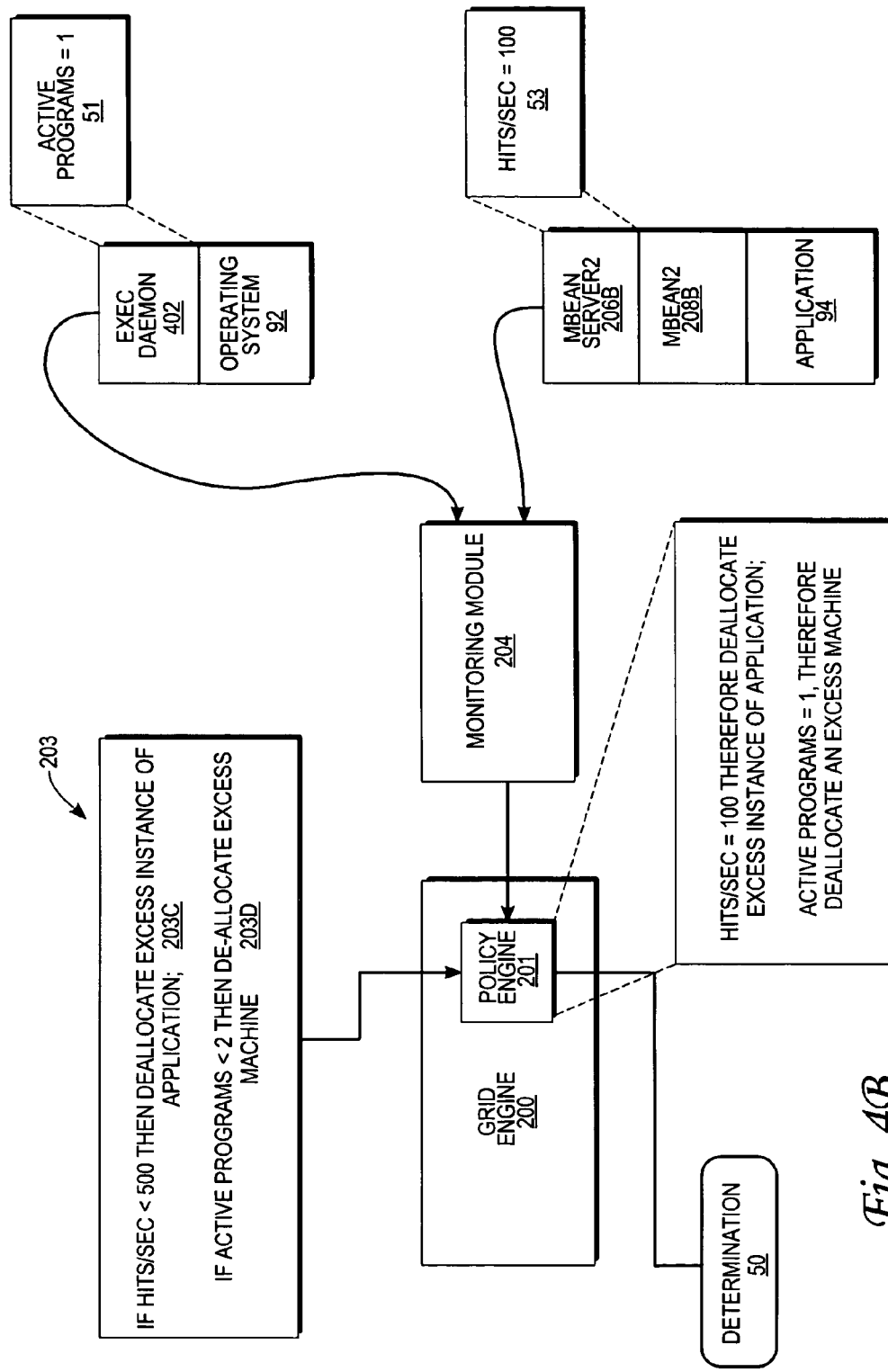

An example of automated management of persistent applications in a grid computing environment in accordance with one embodiment of the present invention will now be described. In the following discussion, reference will be made to an example grid of FIGS. 4A-4B. FIGS. 4A-4B are functional block diagrams illustrating an example of automated management in one embodiment of the present invention. In the presently illustrated embodiment, the example service in FIGS. 4A-4B are implemented using a plurality of computing resources, of which operating system 92 and persistent application 94 are illustrated. Other computing resources used to implement the service are not shown in FIGS. 4A-4B to preserve clarity.

Now with reference to FIG. 4A, application 94 is monitored by an MBean 2 208B. MBean 2 208B is an object class associated with application 94. MBean 2 208B exposes performance parameter information 53 from application 94 to MBean server 2 206B using a JMX standard interface. In the illustrated example embodiment, MBean 2 208B exposes performance parameter information 53 about application 94 to MBean server 2 206B. The performance parameter 53 includes a number of hits a web site receives in a second, which is 10,000 in this example. The MBean server 2 206B sends the performance parameter 53 to the monitoring module 204. The monitoring module 204 may also monitor other persistent applications using one more additional means, such as for example MBean 1 208A (not shown in FIG. 4A for clarity).

Further with reference to FIG. 4A, operating system 92 is monitored by an exec daemon 402. An exec daemon 402 is a process associated with operating system 92. The exec daemon 402 collects usage information 51 from operating system 92 and provides the usage information 51 to the monitoring module 204. In this example, the usage information 51 includes a number of active programs executing under operating system 92, which is eight (8). The monitoring module 204 may also monitor other operating systems using one more additional exec daemons (not shown in FIG. 4A for clarity).

The monitoring module 204 receives the performance parameter information from the one or more MBean servers, including MBean server2 206B. The monitoring module 204 receives usage information from the exec daemon 402 also. The monitoring module 204 processes the performance parameter(s) received from each application being monitored in order to provide one or more overall performance parameters for the service. Then, the monitoring module 204 provides the one or more overall performance parameters for the service and the usage information to the policy engine 201.

Again with reference to FIG. 4A, the policy engine 201 of grid engine 200 includes one or more policies 203 that enable making a provisioning decision about physical and operating system resources in the distributed computing environment based upon the performance parameter 53 and the usage information 51. For example, as illustrated by FIG. 4A, policy engine 201 includes a first policy 203a that indicates that if hits/second is greater than 5000 then add (provision) an additional instance of the application. Another policy 203b indicates that if the number of active programs is greater than 10, then add (provision) more physical and operating system resources such as another node. Based upon the 'hits/second=10,000' performance parameter and the 'number of active programs=8' usage information from the monitoring module 204, the policy engine 201 could make a provisioning decision 50 to add another instance of application 94. The policy engine 201 would likely not provision an additional node since, in the present circumstances, the number of active programs, eight (8), is less than the threshold, ten (10), in policy 203b.

In another example illustrated by FIG. 4B, the policy engine 201 uses one or more rules to determine a provisioning decision to free up excess resources. As shown in FIG. 4B, policy engine 201 includes a first policy 203c that indicates that if hits/second is less than 100 then de-allocate an excess instance of the application. Another policy 203d indicates that if the number of active programs is less than 2, then de-allocate an excess node. Based upon the 'hits/second=100' performance parameter and the 'number of active programs=1' usage information from the monitoring module 204, the policy engine 201 could make a provisioning decision 50 to de-allocate an instance of application 94, as well as to de-allocate a node. In this way, policy engine 201 can control the amount of resources allocated to a particular service based upon one or more of performance parameter information 53 and usage information 51.

Accordingly, the above example illustrates how usage information about physical and operating system resources and performance parameter information about applications can be monitored and processed to provide a policy engine with a basis for making provisioning decisions. The above example is intended only for purposes of illustration and not to be limiting of the many embodiments of the present invention.

Hardware Overview

Figure 5:
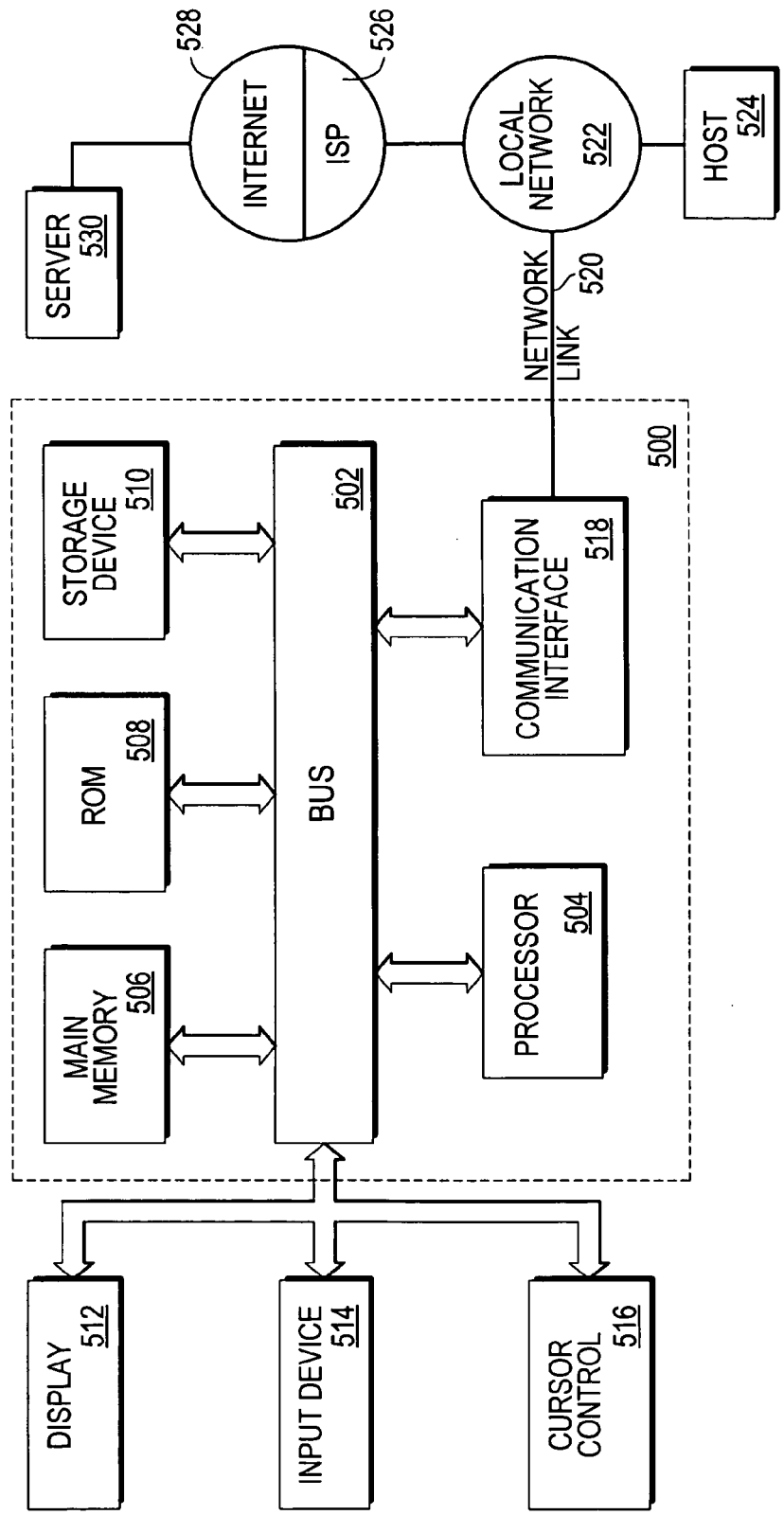
FIG. 5 is a hardware block diagram of an example computer system, which may be used to embody one or more components of an embodiment of the present invention.

FIG. 5 is a block diagram that illustrates a computer system 500 one or more of which an embodiment of the invention may be implemented. Computer system 500 includes a bus 502 for facilitating information exchange, and one or more processors 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions by processor 504. Computer system 500 may further include a read only memory (ROM) 508 or other static storage device coupled to bus 502 for storing static information and instructions for processor 504. A storage device 510, such as a magnetic disk or optical disk, is provided and coupled to bus 502 for storing information and instructions. One or more of the components of the computer system 500 may be located remotely and accessed via a network.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

In computer system 500, bus 502 may be any mechanism and/or medium that enables information, signals, data, etc., to be exchanged between the various components. For example, bus 502 may be a set of conductors that carries electrical signals. Bus 502 may also be a wireless medium (e.g. air) that carries wireless signals between one or more of the components. Bus 502 may further be a network connection that connects one or more of the components. Overall, any mechanism and/or medium that enables information, signals, data, etc., to be exchanged between the various components may be used as bus 502.

Bus 502 may also be a combination of these mechanisms/media. For example, processor 504 may communicate with storage device 510 wirelessly. In such a case, the bus 502, from the standpoint of processor 504 and storage device 510, would be a wireless medium, such as air. Further, processor 504 may communicate with main memory 506 via a network connection. In this case, the bus 502 would be the network connection. Further, processor 504 may communicate with display 512 via a set of conductors. In this instance, the bus 502 would be the set of conductors. Thus, depending upon how the various components communicate with each other, bus 502 may take on different forms. Bus 502, as shown in FIG. 5, functionally represents all of the mechanisms and/or media that enable information, signals, data, etc., to be exchanged between the various components.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, it should be noted that although the invention has been described with reference to one embodiment, it should not be construed to be so limited. Various modifications may be made by those of ordinary skill in the art with the benefit of this disclosure without departing from the spirit of the invention. Thus, the invention should not be limited by the embodiments used to illustrate it but only by the scope of the issued claims. The specification and drawings are, accordingly, to be regarded as illustrative rather than limiting.

What is claimed is:

1. A method implemented within a distributed resource system, the method comprising:

receiving performance parameters pertaining to a service and usage information for physical and operating system resources provided by a plurality of nodes of the distributed resource system, wherein a plurality of persistent applications executes on the plurality of nodes to provide the service, wherein the performance parameters are received from a plurality of software objects external to the plurality of persistent applications and comprise a number of hits to a web page per unit time, and wherein the usage information comprises a number of active programs;

applying a set of one or more policies to the performance parameters to determine if the performance parameters meet one or more conditions specified by the set of policies;

determining whether more or fewer instances of the persistent applications are needed in order to meet the conditions specified by the set of policies, comprising:

determining whether a particular instance of the persistent applications is underutilized, such that utilization of the particular instance is below one or more thresholds specified by the set of policies, wherein the one or more thresholds comprise a threshold of hits to the web page per unit time, and in response to a determination that the particular instance is underutilized, concluding that the particular instance should be de-allocated;

determining whether a particular node of the plurality of nodes is underutilized, such that utilization of the particular node is below one or more thresholds specified by the set of policies, wherein the one or more thresholds comprise a threshold of active programs, and in response to a determination that the particular node is underutilized, concluding that the particular node should be de-allocated.

2. The method of claim 1, further comprising:

in response to a determination that at least one additional instance of the persistent application is needed:

making a provisioning decision based at least partially upon the usage information.

3. The method of claim 2, wherein making a provisioning decision further comprises:

determining whether the additional instance should be provisioned on one of the plurality of nodes on which an instance of the persistent application is already executing.

4. The method of claim 3, further comprising:

in response to a determination that an additional instance should be provisioned on one of the plurality of nodes on which an instance of the persistent application is already executing:

selecting from the plurality of nodes, nodes upon which additional instances of the persistent application may be deployed; and deploying additional instances of the persistent application on the selected nodes.

5. The method of claim 2, wherein making a provisioning decision further comprises:

determining whether one or more unused instances of the persistent application are deployed on one or more of the plurality of nodes.

6. The method of claim 5, further comprising:

in response to a determination that at least one unused instance of the persistent application exists:

selecting from excess persistent application instances, one or more instances of the persistent application that may be off-loaded; and de-allocating the selected instances of the persistent application.

7. The method of claim 1, wherein the physical and operating system resources include at least one of processors, storage and peripheral devices.

8. The method of claim 1, wherein the persistent application includes at least one of an application server, a web server, a portal server, a directory server, a web host, a mail host, a communication infrastructure provisioning application, a DSL provisioning application, a frame relay circuit provisioning application, a simulation application, a large volume data processing application and a data resource infrastructure manager.

9. The method of claim 1, wherein the performance parameters further include at least one of a response time and a number of transactions per unit time.

10. The method of claim 1, wherein the usage information includes at least one of a CPU utilization, a bandwidth utilization and a number of applications per operating system image.

11. A non-transitory machine-readable storage medium carrying one or more sequences of instructions for automating management of Scalable Distributed Persistent Applications (SDPA), which instructions, when executed by one or more processors implemented within a distributed resource system, cause the one or more processors to carry out the steps of:

receiving performance parameters pertaining to a service and usage information for physical and operating system resources provided by a plurality of nodes of the distributed resource system, wherein a plurality of persistent applications executes on the plurality of nodes to provide the service, wherein the performance parameters are received from a plurality of software objects external to the plurality of persistent applications and comprise a number of hits to a web page per unit time, and wherein the usage information comprises a number of active programs;

applying a set of one or more policies to the performance parameters to determine if the performance parameters meet one or more conditions specified by the set of policies;

determining whether more or fewer instances of the persistent applications are needed in order to meet the conditions specified by the set of policies, comprising:

determining whether a particular instance of the persistent applications is underutilized, such that utilization of the particular instance is below one or more thresholds specified by the set of policies, wherein the one or more thresholds comprise a threshold of hits to the web page per unit time, and in response to a determination that the particular instance is underutilized, concluding that the particular instance should be de-allocated;

determining whether a particular node of the plurality of nodes is underutilized, such that utilization of the particular node is below one or more thresholds specified by the set of policies, wherein the one or more thresholds comprise a threshold of active programs, and in response to a determination that the particular node is underutilized, concluding that the particular node should be de-allocated.

12. The non-transitory machine-readable storage medium of claim 11, wherein the instructions for automating management of Scalable Distributed Persistent Applications (SDPA) further comprise instructions for carrying out the steps of: in response to a determination that at least one additional instance of the persistent application is needed: making a provisioning decision based at least partially upon the usage information.

13. The non-transitory machine-readable storage medium of claim 12, wherein the instructions for making a provisioning decision further comprise instructions for carrying out the steps of: determining whether the additional instance should be provisioned on one of the plurality of nodes on which an instance of the persistent application is already executing.

14. The non-transitory machine-readable storage medium of claim 13, wherein the instructions for automating management of Scalable Distributed Persistent Applications (SDPA) further comprise instructions for carrying out the steps of: in response to a determination that an additional instance should not be provisioned on one of the plurality of nodes on which an instance of the persistent application is already executing: selecting from the plurality of nodes, nodes upon which additional instances of the persistent application may be deployed; and deploying additional instances of the persistent application on the selected nodes.

15. The non-transitory machine-readable storage medium of claim 12, wherein the instructions for making a provisioning decision further comprise instructions for carrying out the step of: determining whether one or more unused instances of the persistent application are deployed on one or more of the plurality of nodes.

16. The non-transitory machine-readable storage medium of claim 15, wherein the instructions for automating management of Scalable Distributed Persistent Applications (SDPA) further comprise instructions for carrying out the steps of: in response to a determination that at least one unused instance of the persistent application exists: selecting from excess persistent application instances, one or more instances of the persistent application that may be off-loaded; and de-allocating the selected instances of the persistent application.

17. The non-transitory machine-readable storage medium of claim 11, wherein the physical and operating system resources include at least one of processors, storage and peripheral devices.

18. The non-transitory machine-readable storage medium of claim 11, wherein the persistent application includes at least one of an application server, a web server, a portal server, a directory server, a web host, a mail host, a communication infrastructure provisioning application, a DSL provisioning application, a frame relay circuit provisioning application, a simulation application, a large volume data processing application and a data resource infrastructure manager.

19. The non-transitory machine-readable storage medium of claim 11, wherein the performance parameters further include at least one of a response time and a number of transactions per unit time.

20. The non-transitory machine-readable storage medium of claim 11, wherein the usage information includes at least one of a CPU utilization, a bandwidth utilization and a number of applications per operating system image.

21. An apparatus implemented within a distributed resource system, the apparatus comprising:
a processor;
a memory, connected to the processor by a bus; and
one or more stored sequences of instructions which, when executed by the processor, cause the processor to carry out the steps of:
receiving performance parameters pertaining to a service and usage information for physical and operating system resources provided by a plurality of nodes of the distributed resource system, wherein a plurality of persistent applications executes on the plurality of nodes to provide the service, wherein the performance parameters are received from a plurality of software objects external to the plurality of persistent applications and comprise a number of hits to a web page per unit time, and wherein the usage information comprises a number of active programs;
applying a set of one or more policies to the performance parameters to determine if the performance parameters meet one or more conditions specified by the set of policies;
determining whether more or fewer instances of the persistent applications are needed in order to meet the conditions specified by the set of policies, comprising:
determining whether a particular instance of the persistent applications is underutilized, such that utilization of the particular instance is below one or more thresholds specified by the set of policies, wherein the one or more thresholds comprise a threshold of hits to the web page per unit time, and
in response to a determination that the particular instance is underutilized, concluding that the particular instance should be de-allocated;
determining whether a particular node of the plurality of nodes is underutilized, such that utilization of the particular node is below one or more thresholds specified by the set of policies, wherein the one or more thresholds comprise a threshold of active programs, and
in response to a determination that the particular node is underutilized, concluding that the particular node should be de-allocated.

22. The apparatus of claim 21, further comprising instructions for carrying out the steps of:
in response to a determination that at least one additional instance of the persistent application is needed:
making a provisioning decision based at least partially upon the usage information.

23. The apparatus of claim 22, wherein the instructions for making a provisioning decision further comprise instructions for carrying out the steps of:
determining whether the additional instance should be provisioned on one of the plurality of nodes on which an instance of the persistent application is already executing.

24. The apparatus of claim 23, further comprise instructions for carrying out the steps of:
in response to a determination that an additional instance should be provisioned on one of the plurality of nodes on which an instance of the persistent application is already executing:
selecting from the plurality of nodes, nodes upon which additional instances of the persistent application may be deployed; and
deploying additional instances of the persistent application on the selected nodes.

25. The apparatus of claim 22, wherein the instructions for making a provisioning decision further comprise instructions for carrying out the step of:
determining whether one or more unused instances of the persistent application are deployed on one or more of the plurality of nodes.

26. The apparatus of claim 25, further comprising instructions for carrying out the steps of:
in response to a determination that at least one unused instance of the persistent application exists:
selecting from excess persistent application instances, one or more instances of the persistent application that may be off-loaded; and
de-allocating the selected instances of the persistent application.

27. The apparatus of claim 21, wherein the physical and operating system resources include at least one of processors, storage and peripheral devices.

28. The apparatus of claim 21, wherein the persistent application includes at least one of an application server, a web server, a portal server, a directory server, a web host, a mail host, a communication infrastructure provisioning application, a DSL provisioning application, a frame relay circuit provisioning application, a simulation application, a large volume data processing application and a data resource infrastructure manager.

29. The apparatus of claim 21, wherein the performance parameters further include at least one of a response time and a number of transactions per unit time.

30. The apparatus of claim 21, wherein the usage information includes at least one of a CPU utilization, a bandwidth utilization and a number of applications per operating system image.

31. An apparatus implemented within a distributed resource system, the apparatus, comprising:
means for receiving performance parameters pertaining to a service and usage information for physical and operating system resources provided by a plurality of nodes of the distributed resource system, wherein a plurality of persistent applications executes on the plurality of nodes to provide the service, wherein the performance parameters are received from a plurality of software objects external to the plurality of persistent applications and comprise a number of hits to a web page per unit time, and wherein the usage information comprises a number of active programs;
means for applying a set of one or more policies to the performance parameters to determine if the performance parameters meet one or more conditions specified by the set of policies;
means for determining whether more or fewer instances of the persistent applications are needed in order to meet the conditions specified by the set of policies, comprising:
means for determining whether a particular instance of the persistent applications is underutilized, such that utilization of the particular instance is below one or more thresholds specified by the set of policies, wherein the one or more thresholds comprise a threshold of hits to the web page per unit time, and means for concluding, in response to a determination that the particular instance is underutilized, that the particular instance should be de-allocated;

means for determining whether a particular node of the plurality of nodes is underutilized, such that utilization of the particular node is below one or more thresholds specified by the set of policies, wherein the one or more thresholds comprise a threshold of active programs, and means for concluding, in response to a determination that the particular node is underutilized, that the particular node should be de-allocated.

\* \* \* \* \*